Feb. 5, 1929.
C. AALBORG
1,700,871
CIRCUIT BREAKER
Original Filed Jan. 8, 1923
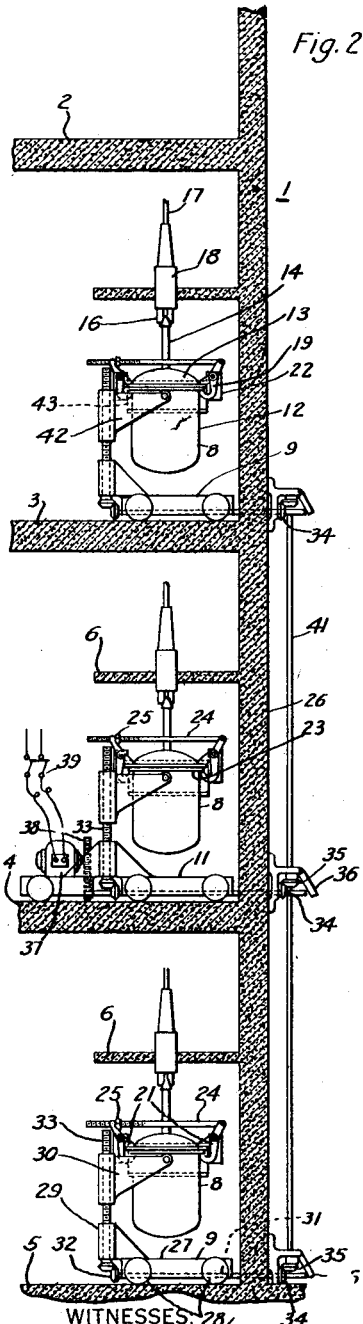
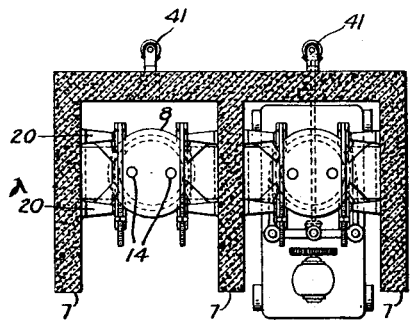
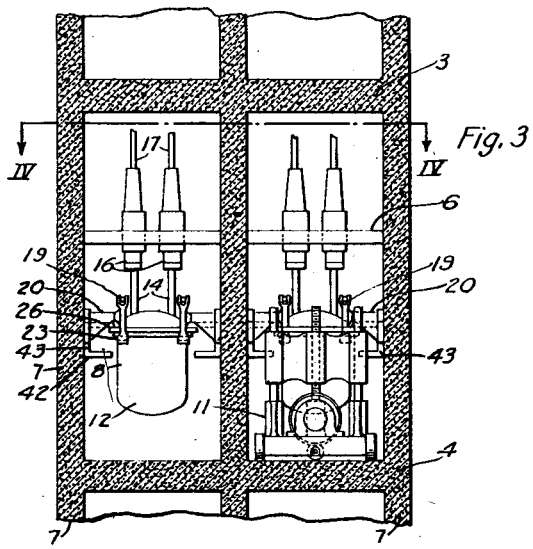
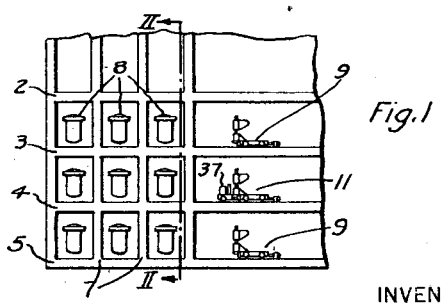
INVENTOR
Christian Aalborg
BY
ATTORNEY Patented Feb. 5, 1929.

1,700,871

UNITED STATES PATENT OFFICE.

CHRISTIAN AALBORG, OF PITTSBURGH, PENNSYLVANIA, ASSIGNOR TO WESTINGHOUSE ELECTRIC & MANUFACTURING COMPANY, A CORPORATION OF PENNSYLVANIA

CIRCUIT BREAKER.

Application filed January 8, 1923, Serial No. 611,259. Renewed January 26, 1927.

My invention relates to systems of installation of circuit interrupters in power stations and more particularly to installations in which the circuit interrupters are in vertical alinement.

One object of my invention is to provide a circuit interrupter system in which a circuit interrupter is in each phase of a polyphase circuit and all the associated circuit interrupters are placed in vertical alinement.

Another object of my invention is to provide a circuit interrupter system in which a plurality of alined circuit interrupters are adapted to be simultaneously raised or lowered.

It is also an object of my invention to provide a circuit interrupter system, having circuit interrupters at a plurality of levels, with portable lifters at each level which may engage any circuit interrupter on that level, and means for simultaneously operating the alined lifters.

It is a further object of my invention to provide a portable lifter for a circuit interrupter system with a motor and to so connect this lifter with the lifters on adjacent levels that the circuit interrupters of any polyphase electrical circuit in the power station may be actuated by a single motor and a suitable number of lifters having no motors.

In my copending application, Serial No. 611,260, filed Jan. 8, 1923, I have shown and described a system of alined circuit interrupters in which a motor is operatively connected to each vertical row of lifters cooperating with the vertically alined circuit interrupters. Suitable interlocked shafting serves to connect the motor to the several lifters. That system necessitates that the number of motors equal the number of vertical tiers or polyphase electrical circuits in the power station. In my present invention, a single motor attached to a portable lifter is able to perform the same duties.

In the accompanying drawings,

Figure 1 is a face view of a portion of a wall of a power station showing a system of circuit interrupters and lifters embodying my invention.

Fig. 2 is a view in vertical section taken along the line II—II of Fig. 1, showing the several lifters in their operative positions.

Fig. 3 is an enlarged face view of a portion of a single level showing a lifter in its operative position.

Fig. 4 is a sectional view taken along the line IV—IV of Fig. 3.

In the several figures of the drawings, the same reference characters indicate like parts.

In the preferred embodiment of my invention a power station 1 is provided with a plurality of floors or levels 2, 3, 4 and 5. Between these floors are placed horizontal shelves 6 and vertical partitions 7, the latter together with the floors 2, 3, 4 and 5 forming cells in each of which is placed a circuit interrupter 8.

On certain of the floors is placed a single portable lifter 9 and on one of the floors is placed a lifter 11 of a particular construction to be hereinafter more fully described.

Each of the circuit interrupters 8 comprises a tank portion 12 and a cover portion 13 which carries conductors 14. Conductors 14 terminate in disconnecting contact members 16, which coact with external electrical conductors 17 that are secured in bushings 18 supported by the shelves 6.

A quickly detachable supporting and connecting mechanism 19 is secured to the side walls of each cell by brackets 20 for the purpose of engaging the tank portions of the circuit interrupters and thereby supporting them. The detachable mechanism 19 may be of any conventional type, although I prefer to employ that shown and described in my copending application, Serial No. 611,258, filed Jan. 8, 1923. This mechanism comprises two pairs of oppositely disposed levers 21 that are pivotally mounted on the brackets 20, each of the levers being provided with a hook 22 for engaging the flange portion 23 of the circuit interrupter tanks 12. The relative positions of the members of pairs of levers 21 are controlled by a threaded shaft 24 that extends therebetween and is provided with an adjusting nut 25 thereon.

As is shown in Fig. 3, the cover member 13 of each circuit interrupter is equipped with a flange 26 of larger diameter than the flange 23. These flanges are permanently clamped together by the mechanism 19 when the circuit interrupter is in its operative position.

The lifters 9 of each comprise a body portion 27 which is supported on wheels 28 and carries a frame 29 which is equipped with arms 30. The body portion 27 carries a horizontal shaft 31 having a beveled gear connection 32 to a vertical threaded shaft 33 for adjusting the position of the arms 30. The other end of the shaft 31 is provided with a bevel gear wheel 34 that is adapted to pass through an opening in the wall of the station to engage a similar gear wheel 35 and a lock mechanism 36, the details of which are shown and described in my copending application, Serial No. 611,260, filed Jan. 8, 1923. The lifter 11 differs from the lifters 9 in that the body portion 27 supports a motor 37 which is geared at 38 to the shaft 30. A detachable electrical connector 39 is carried by the motor 37. The several lifters, when in their operative positions, have a common operative connection to the motor 37 through shaft 41.

In the operation of an installation of circuit interrupters, it is often desirable to open and inspect the circuit interrupters of each polyphase circuit. However, care should be taken that all the circuit interrupters of each polyphase circuit be moved as a unit. In order to open any of said circuit interrupters, the lifters 9 and 11 are placed in their properly alined cells in such positions that the arms 30 are beneath the corresponding flanges 23 of the tank portions 12 and the bevel gear wheels 34 and 35 are in engagement. The end portions of the shafts 31 release the interlock mechanism 36 to permit the operation of the shaft 41.

The motor 37 is then energized, and it operates through the gearing 38, the associated shaft 31, the several pairs of gear wheels 34 and 35 and shaft 41 to effect the raising of the arms 30 of the several lifters until they engage the flanges 23 to remove the weight of the circuit interrupters from the connecting mechanisms 19. The latter are then disengaged from the tanks by actuation of the adjusting nuts 25 to permit the removal of the hooks from the flanges 23. The motor 37 is then reversed and the circuit interrupters are then lowered. The initial downward movement of the circuit interrupters causes the separation of the contact members 16 of conductors 14 from conductors 17 to insure the de-energization of the circuit interrupter mechanism.

Downward motion of the circuit interrupters continues until the flanges 26 of the covers engage the lower flanges 42 of channel beams 43 that are secured to the sides of the cell walls. The covers and the attached circuit interrupter mechanism are supported by the beams 43. The flanges 23 of the tank portions 12, being of smaller diameter pass between the flanges 42, and the downward movement continues until the tanks 12 rest upon the body portions 27 of the several lifters 9 and 11, whereupon the motor 37 is stopped by the operator.

The several lifters 9 and 11 may then be disconnected from the shaft 41 and taken to any suitable point for repair of the tanks 12 or to permit access to the suspended cover portions 13.

When it is desired to replace the circuit interrupters the several steps are reversed. The lifters 9 and 11 are first placed in their respective cells and in engagement with the shaft 41. The motor is then operated to raise the arms 30 and the tanks 12 until engagement is made with the suspended covers 13. The entire circuit interrupters are then raised to their operative positions where their weight is transferred from the arms 30 to the hooks 22 of the levers 21 by manipulation of the adjusting mechanisms. The lifters 9 and 11 are then removed from the several cells and are available for use elsewhere in the power station.

By my invention I have provided an installation of circuit interrupters for a power station which permits ready access to the inclosed parts of the individual circuit interrupters and that requires a single lifter for each floor or level of the power station regardless of the number of circuit interrupters on the floor. One of the lifters is equipped with a motor which may be transferred to any desired point in the power station, although it is preferably placed on an intermediate floor, as is shown in Fig. 2, where it is obvious that a small amount of shafting 41 is needed to reach the other floors. My invention, moreover, provides a great improvement in that a single operator may, by means of a single motor, lower or raise any or all of the circuit interrupters in any vertical row in the power station.

It will be apparent that various modifications may be made in the apparatus without departing from the spirit of the invention, as defined in the accompanying claims.

I claim as my invention:

1. In an electrical apparatus, a plurality of circuit interrupters at each of a plurality of levels, a portable lifting member at each of said levels, one of said lifters being equipped with a power device, and means for connecting the several lifting members when in their operative positions.

2. In an electrical apparatus, a plurality of circuit interrupters in vertical alinement, a portable lifter for each of said circuit interrupters, one of said lifters being equipped with a power device, and connecting means between said lifters when in their operative positions.

3. In an electrical apparatus, a plurality of circuit interrupters at different levels, a lifter at each level, said lifters being interchangeable between the several circuit interrupters, a power device being associated with one of said lifters, and connecting means between the several lifters when in their operative positions.

4. In an electrical apparatus, a plurality of circuit interrupters at different levels, a portable lifter at each level, an electrical motor secured to one of said lifters, and connecting means between said lifters when in their operative positions whereby said motor simultaneously operates all of said lifters.

5. In an electrical apparatus, a plurality of circuit interrupters at each of a plurality of levels, a portable lifter at each of said levels for selective engagement with any circuit interrupter on that level, a power device being associated with one of said lifters, and connecting means between the several levels whereby said power device operates all of said lifters when the latter are in their alined operating positions.

In testimony whereof, I have hereunto subscribed my name this second day of January 1923.

CHRISTIAN AALBORG.